United States Patent [19]

Hayward

[11] 4,244,166
[45] Jan. 13, 1981

[54] BALE ROLLING MACHINE

[75] Inventor: Frank E. Hayward, Vinton, Iowa

[73] Assignee: Chromalloy American Corporation, Vinton, Iowa

[21] Appl. No.: 31,323

[22] Filed: Apr. 19, 1979

[51] Int. Cl.³ .................... A01D 43/02; A01F 15/00
[52] U.S. Cl. ........................................ 56/341; 100/88
[58] Field of Search ................. 56/341-344, 56/364; 100/88

[56] References Cited

U.S. PATENT DOCUMENTS

| | | | |
|---|---|---|---|
| 3,534,537 | 10/1970 | Buchele et al. | 56/341 |
| 3,691,741 | 9/1972 | White et al. | 56/344 |
| 3,722,197 | 3/1973 | Vermeer | 100/88 |
| 3,837,159 | 9/1974 | Vermeer | 56/341 |
| 3,895,573 | 7/1975 | Phillips et al. | 100/88 |
| 3,901,007 | 8/1975 | Blanshine et al. | 56/341 |
| 4,103,475 | 8/1978 | Kampman et al. | 56/341 |
| 4,121,513 | 10/1978 | Kopaska | 100/88 |

Primary Examiner—Paul J. Hirsch

Attorney, Agent, or Firm—Wegner, Stellman, McCord, Wood & Dalton

[57] ABSTRACT

Apparatus for rolling large bales of fodder has a wheeled frame adapted to be towed behind a farm tractor. A baling chamber has a floor with fodder conveyor chains carried in recessed channels so that only fodder engaging lugs are above the floor and the weight of the forming bale is carried by the floor. The floor pivots in the baler frame. The sides of the baling chambers are defined by rotating raddle guide discs which support the ends of raddles on baling raddle chains that define the rear, top and front of the baling chamber. The raddle guide members have circular raddle confining plates, and on the inner faces of the plates are raddle supporting flanges the diameter of which is substantially less than the diameter of the confining plates, so the raddles move outwardly for a substantial distance due to pressure of the forming bale while a relatively thick outer part of the bale is held between the confining plates of the rotating raddle guide discs. Bale formation is improved by running the baling raddle chains slightly faster than the conveyor chains.

21 Claims, 6 Drawing Figures

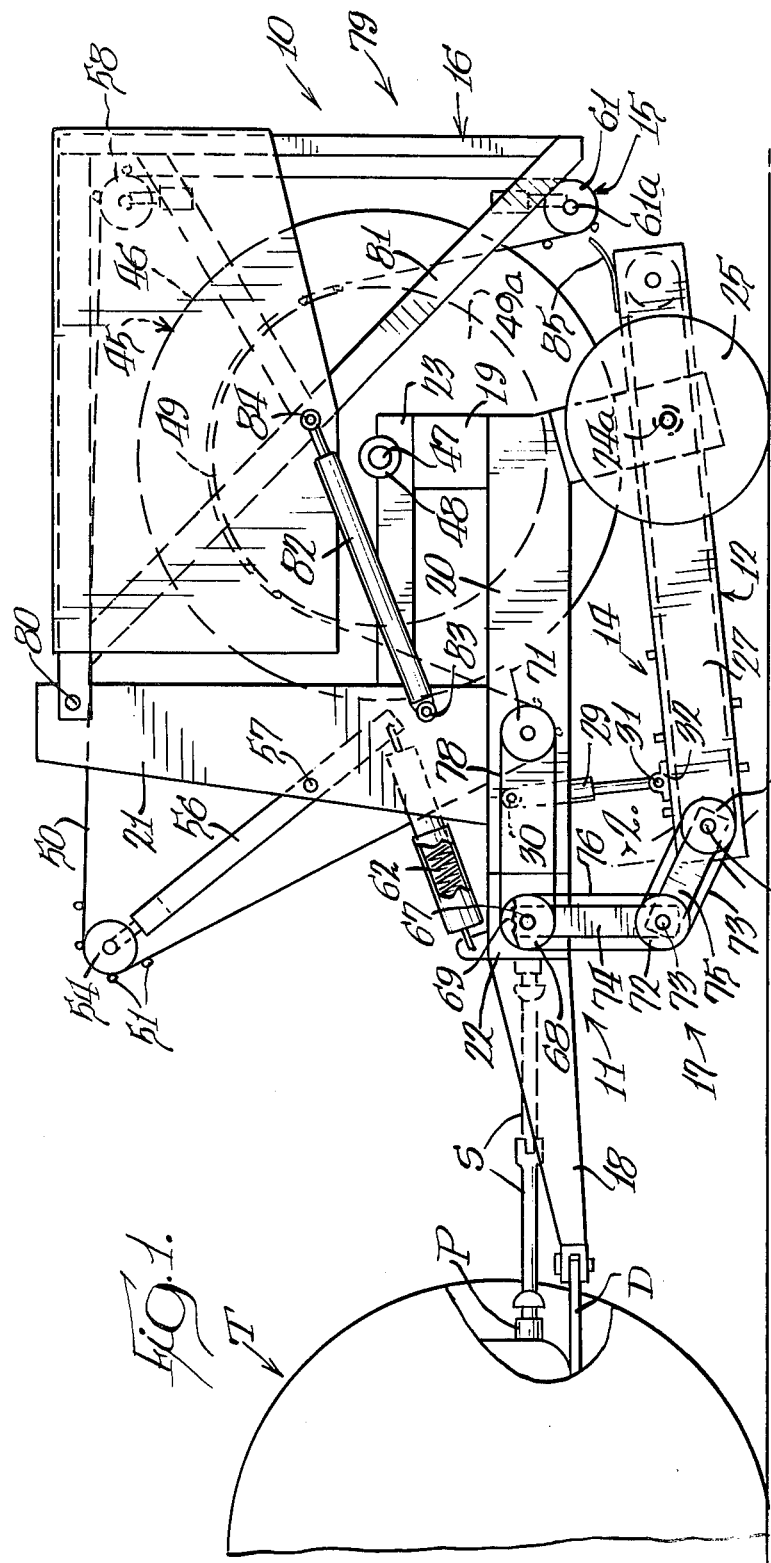

BALE ROLLING MACHINE

CROSS-REFERENCE TO RELATED APPLICATIONS

This application relates in part to improvements upon the apparatus disclosed and claimed in U.S. patent application Ser. No. 29,722, filed Apr. 13, 1979, by Richard K. Berky, assigned to applicant's assignee.

BACKGROUND OF THE INVENTION

Since about the early 1960's considerable work has been done toward developing machines which will roll large bales of hay or other fodder, containing from about 1,000 pounds (about 450 kgs) to about 1,200 pounds (about 550 kgs). Such a bale is about 5 feet (1.5 m) in length and diameter. The first such machine was disclosed in Avery U.S. Pat. No. 3,110,145, which rolls such bales in contact with the ground.

More recent developments have taken the form of balers which have a frame with a floor provided with fodder conveyor chains or belts, with a conventional fodder pickup head at the front of the frame to feed fodder off the ground onto the conveyor. Fodder moved rearwardly by the conveyor is picked up by a forwardly moving run of bale rolling chains with cross raddles which are above the floor, with the baling raddle chains biased to minimize the length of the baling run which can expand as a bale increases in size. In principle, such balers are like an Avery baler, rolling the bale on a floor conveyor instead of on the ground. Typical of such balers is the one disclosed in Blanshine et al U.S. Pat. No. 3,901,007, which has fodder conveyor chains carried in guide channels mounted on the floor, with fodder engaging lugs on the chains.

Initially it was believed desirable to roll such bales as densely as possible, both to get the largest quantity of fodder into a bale of given size and to make the bale as weatherproof as possible. More recently it has been learned that such bales should have a relatively loose core for air circulation with a more densely packed peripheral portion to shed water and also provide the bale with a relatively rigid outer shell. Apparatus for rolling a "soft core" bale is disclosed in Kampman et al U.S. Pat. No. 4,103,475, owned by applicant's assignee, which has apparatus that rolls bales with a soft core that constitutes a very large percentage of the volume of the bale, with a relatively thin peripheral portion of greater density.

SUMMARY OF THE INVENTION

The present apparatus has a floor with parallel, longitudinal upwardly open chain guiding channels recessed in it. Endless chain fodder conveyor means has the working run of each of the conveyor chains completely recessed in one of the channels, and the chains have fodder engaging lugs which project above the floor.

The above described improvement in the fodder supporting floor and conveyor provides the maximum possible uniformity in the pressure applied to the entire surface of the bale during a rolling operation. In the prior art structures which have the chains running in channels on top of the floor, a disproportionate part of the weight of the forming bale is carried upon the chains and the channels, resulting in bands of greater and lesser density. In addition, taking the weight of the forming bale off the chains greatly reduces friction on the bottom of the chains, thereby reducing both chain wear and power requirements.

The improved wrap of the bale which results from the new floor-conveyor chain relationship is further enhanced by driving the baling raddle chains at a linear speed which is slightly greater than that of the fodder conveyor chains. A speed differential of the order of 6% tends to produce a tighter rolled bale than has been possible with the prior art, in which the usual practice has been to run the baling raddle chains slower than the fodder conveyor chains.

Finally, the overall quality of the bale produced by the present apparatus is improved as compared with that of a baler using rotating raddle guides as disclosed in Kampman et al U.S. Pat. No. 4,103,475 by providing raddle supporting flanges which are surrounded by circular raddle confining plates substantially larger than the outside diameter of the supporting flanges. The raddles move outwadly for a substantial distance due to pressure of the forming bale while a relatively thick outer part of the bale is held between the confining plates. When the apparatus of U.S. Pat. No. 4,103,475 was developed, it was thought that the most desirable bale would have a soft core of maximum diameter and a denser peripheral portion as thin as is consistent with the bale having adequate water shedding characteristics. Applicant has now found that a better bale is produced by having a smaller core and a correspondingly thicker outer layer. The resulting bale holds its shape better, and also may have an average density which causes the weight of a bale that is about 5 feet (1.5 m) in length and diameter to be between 1,000 pounds (about 450 kgs) and about 1,200 pounds (about 550 kgs). Bales produced by the apparatus of Kampman et al U.S. Pat. No. 4,103,475 have a much lower average density which is less acceptable to farmers baling a fodder crop. If bale diameter is enough greater than that of the raddle supporting discs to provide a better average density, then the confinement of the ends of the bale between the fixed baler side plates creates undesirable drag on the forming bale.

THE DRAWINGS

FIG. 1 is a side elevational view of the apparatus of the invention in baling position;

FIG. 2 is a fragmentary sectional view on an enlarged scale taken substantially as indicated along the line 2—2 of FIG. 1;

FIG. 3 is a sectional view taken substantially as indicated along the line 3—3 of FIG. 2;

FIG. 4 is a fragmentary sectional view on an enlarged scale taken substantially as indicated along the line 4—4 of FIG. 3;

Figure 5:
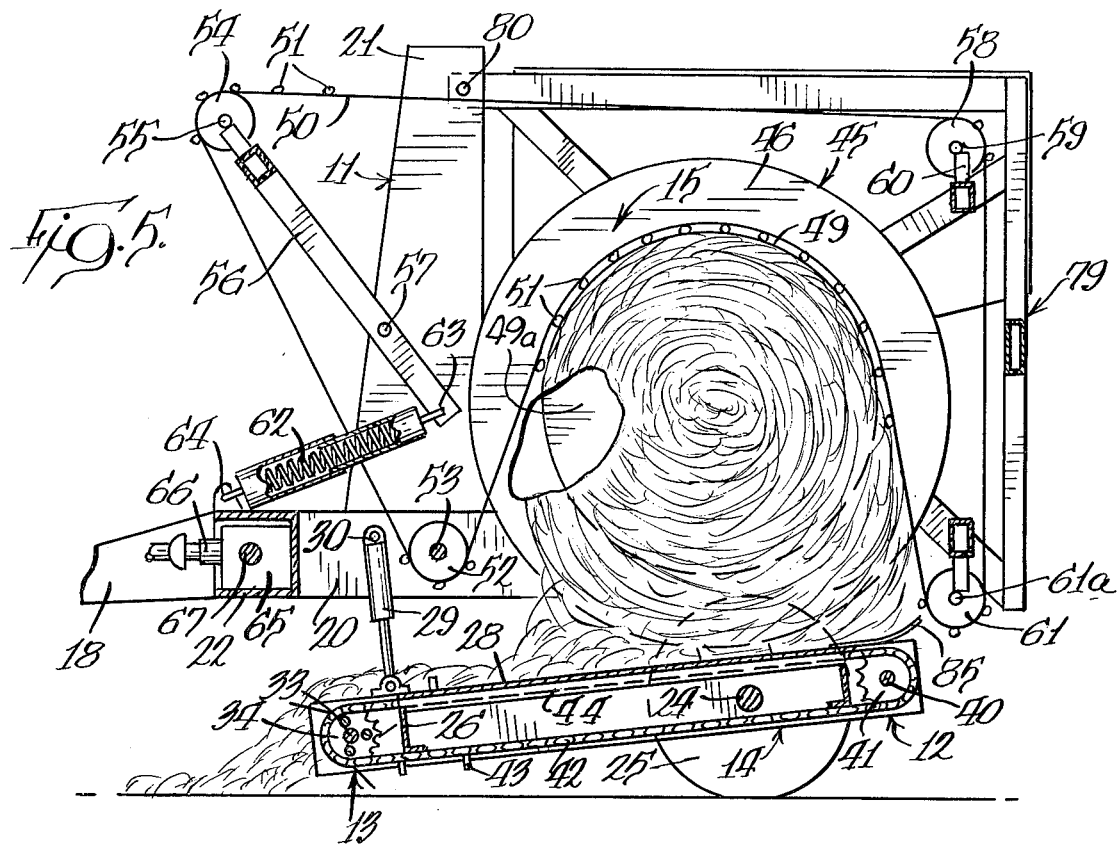
Figure 6:
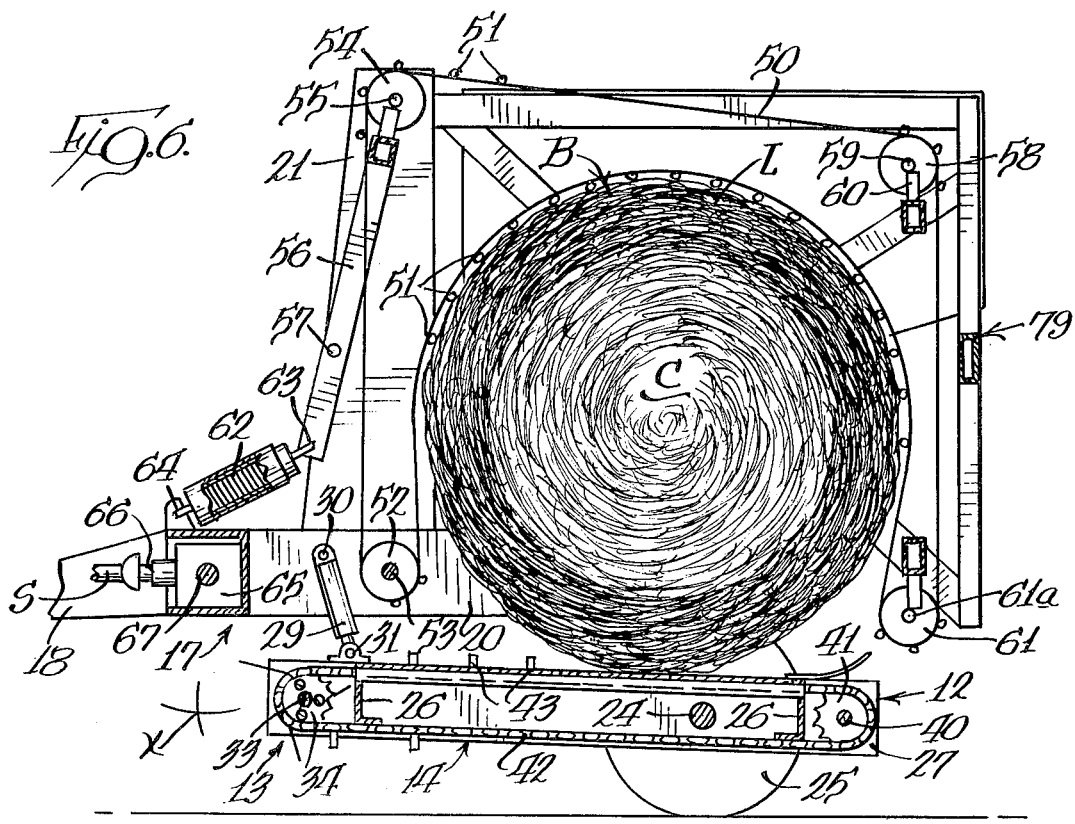

FIG. 5 is a fragmentary longitudinal sectional view of the apparatus illustrating the approximate condition at the stage of a bale rolling cycle when a bale is approaching the size at which the pressure of the forming bale will lift the raddles off the raddle guides; and FIG. 6 is a view similar to FIG. 5 illustrating the conditions after a completed bale has been wrapped with twine and before it is released from the apparatus.

DETAILED DESCRIPTION OF THE INVENTION

Referring to the drawings in detail, the apparatus of the present invention, indicated generally at 10, has principal components including a frame, indicated generally at 11; a floor, indicated generally at 12; fodder pickup means, indicated generally at 13; fodder conveying means, indicated generally at 14; bale rolling means, indicated generally at 15; bale release means, indicated generally at 16; and drive means, indicated generally at 17. The apparatus is constructed to be drawn behind a farm tractor T by attachment of a hitch means 18 to a tractor drawbar D, and to be driven by operatively connecting the drive means 17 to a tractor PTO, P, through conventional slip tubes S arranged in tandem.

The frame 11 consists of upright side beams 19, longitudinal side beams 20, upright front beams 21, and a large forwardly open cross channel beam 22 from which the hitch means 18 extends forwardly. Upper longitudinal side members 23 extend from the upper ends of the upright side beams 19 to the upright front beams 21. At the lower ends of the beams 19 is a shaft 24 which extends through the upright side beams 19 and has reduced spindles 24a to receive journals for supporting wheels 25. Immediately inside the side beams 19 the shaft 24 provides a pivotal mounting for the floor 12.

The floor 12 consists of transverse channel members 26 the outer extremities of which are welded to the side channel plates 27, and a deck 28 has its ends supported upon the cross channels 26 and its sides supported upon the side channels 27. At the front of the floor 12 is a pair of hydraulic cylinder units 29 which are pivotally mounted at 30 upon the longitudinal side beams 20, and which have their rod ends pivotally connected at 31 to pivot blocks 32 on the floor side channels 27. The hydraulic cylinder units 29 are, of course, connected to the tractor hydraulic system so the floor may be pivoted between a fodder pickup position as illustrated in FIGS. 1 and 5 and a bale rolling and discharge position as illustrated in FIG. 6. The pivoting of the floor 12 also permits adjustment of the pickup means 13 with reference to the ground, which is important in adjusting the apparatus for optimum performance in the handling of different types of fodder crops.

The fodder pickup means 13 and the fodder conveying means 14 have a common drive shaft 33 which is journalled in the floor side channels 27 and carries front conveyor sprockets 34 in which pickup shafts 35 are journalled. Each of the pickup shafts has a crank arm 36 at one end which has a cam follower roller 37 that rides in an eccentric cam track 38 so that pickup tines 39 on the pickup shafts 35 may be projected outwardly as they pass through the forward part of their circle of rotation, and may be retracted as they swing to the rear of the drive shaft 33.

In addition to the drive shaft 33 and sprockets 34, the fodder conveying means 14 includes an idler shaft 40 upon which rear idler sprockets 41 are journalled, and conveyor chains 42 are carried upon the sprockets 34 and 41. Carried upon the conveying chains 42 are fodder engaging lugs 43.

As best seen in FIG. 4, the floor plate 28 has longitudinal slots 28a to accommodate the conveyor chains 42, and beneath the slots 28a are guide channels 44 which are deep enough that only the lugs 43 on the conveyor chains 42 extend above the floor plate 28. This recessed mounting of the chains 42 causes the entire weight of the forming bale to be distributed evenly across the floor plate, and eliminates the heavy load upon the chains 42 which is characteristic of prior art large bale rollers in which the conveyor chains are carried in guide channels on top of the floor. The present structure constitutes a substantial improvement, both because it reduces chain wear, reduces power requirements due to elimination of most of the chain friction, and also provides more uniform density from end to end of the bale, eliminating bands of denser material which are typical of bales rolled in bale rolling machines that have the conveyor chains above the floor.

The bale rolling means 15 includes rotating raddle guide members, indicated generally at 45, which have planar circular side plates 46 which have spindles 47 carried in journals 48 on the frame 11. On the inner faces of the plates 46 are annular raddle supporting flanges 49 which are defined by the periphery of discs 49a that are integral and concentric with the circular side plates 46.

In a typical apparatus, the plates 46 are 60 inches (152.4 cm) in diameter and the diameter of the raddle supporting flanges 49 is 42.5 inches (107.9 cm); or about 70% of the disc diameter.

The indicated relative diameters of the plates 46 and the flanges 49 produce bales B which have a soft core C with a relatively thick, dense peripheral layer L. Such bales hold their shape well, especially if formed under conditions producing an average density that causes a bale 5 feet (1.5 m) in length and diameter to weigh between about 1,000 pounds (450 kgs) and 1,200 pounds (550 kgs).

The baling means 15 also includes a pair of endless baling raddle chains 50 which carry transverse raddles 51. The baling raddle chains 50 are trained around drive sprockets 52 upon a drive shaft 53 which is carried in journals toward the lower ends of the front upright frame members 21; ride upon front upper sprockets 54 which are journalled upon shafts 55 on tensioning arms 56 which are pivoted at 57 on the frame members 21; thence around upper gate sprockets 58 journalled at 59 upon brackets 60 at the upper ends of the gate; thence around lower gate sprockets 61 journalled at 61a on brackets at the lower ends of the gate; and thence are guided over the raddle guides 45 the annular flanges 49 of which support the outer extremities of the raddles 51 as seen in FIG. 5. Thus, when the apparatus is in baling position a baling chamber is defined by the floor plate 28, the rotating raddle guides 45, and a baling run of the baling raddle chains 50 and raddles 51 which extends from the rear lower gate sprockets 61 over the rolling raddle supporting flanges 49, and downwardly to the drive sprockets 52.

Baling raddle chain tensioning means comprises springs 62 which are connected to the tensioning arms 56 at 63 and to the front of the frame at 64. Thus, the tensioning springs 62 constantly bias the sprockets 54 in a direction to minimize the length of the baling run of the baling raddle chains 50.

Referring primarily to FIGS. 1, 3, 5 and 6, the drive means 17 includes a gear box 65 which is positioned in the front channel beam 22 and has a forwardly extending input shaft 66 which is operatively connected to the rear slip tube S. The gear box 65 has an output shaft 67 on the outer end of which are drive sprockets 68 and 69.

The sprocket 68 provides a drive for a drive sprocket 70 on the pickup and conveyor input shaft 33; while the sprocket 69 provides a drive for a drive sprocket 71 on the baling raddle chain drive shaft 53. The pivotal mounting of the floor 12, which moves the pickup and conveyor shaft 33 with reference to the gear box output shaft 67, requires that the driving connection between the sprockets 68 and 70 be through a dual sprocket 72 which is journalled on a pivotal connection 73 between a first pivoted arm 74 and a second pivoted arm 75 which turn, respectively, about the axes of the gear box output shaft 67 and the pickup and conveyor drive shaft 33. A first drive chain 76 operatively connects the sprocket 68 to one of the dual sprockets 72; while a second drive chain 77 connects the other of the dual sprockets 72 with the pickup and conveyor drive sprocket 70.

There is a direct driving connection from the sprocket 69 to the baling chain drive sprocket 71 through a drive chain 78.

The relative diameters and number of teeth of the sprockets 70 and 71 cause the baling raddle chains 50 to run at a linear speed that is slightly (about 6%) greater than that of the fodder conveyor chains 42.

The bale release means 16 consists of a gate, indicated generally at 79, which is pivoted at 80 on the upright front beams 21. The gate 79 is seen to have a framework that includes main inclined side rails 81; and the gate is swung upwardly about the pivots 80 to a bale release position by hydraulic cylinder units 82 which are pivotally mounted at 83 on the upright front beams 21 and at 84 on the gate side rails 81.

In operation, the baling apparatus is towed along a windrow of fodder by a farm tractor T with the tractor power takeoff P driving the fodder pickup means 13, the fodder conveyor means 14 and the chains of the bale rolling means 15. The fodder pickup tines 39 lift the material in the windrow onto the floor plate 28 where it is engaged by the chain lugs 43. At the rear of the floor plate, upwardly curved spring plates 85 guide the rearwardly moving fodder upwardly into the reach of the baling raddles 51 which function to roll the stream of fodder forwardly upon itself into a spiral bale which is confined between the rotating raddle guides 45. When the forming bale becomes large enough to be in contact with the raddles where they pass over the top of the rolling raddle guide flanges 49, the pressure of the forming roll begins to lift the chains 50 off the raddle guide flanges 49, thus compressing the fodder in the bale. For this to occur, of course, the tensioning arms 56 must swing clockwise about the pivots 57 against the bias of the springs 62 so as to decrease the length of the chain run between the sprockets 54 and 58 and increase the length of the baling run between the sprockets 61 and the sprockets 52.

When the bale reaches a desired size which is approximately as illustrated in FIG. 6, the operator stops the tractor, actuates the hydraulic cylinders 29 to raise the front of the floor 12, and then actuates the hydraulic cylinder 82 to open the discharge gate means 16. Continuing operation of the fodder conveyor chains 42 rolls the finished bale off the rear of the baler, after which the discharge gate means 16 is returned to normal position, the floor 12 is returned to the forwardly tilted position, and the tractor is again moved forward to start building a new bale.

Preferably the baling apparatus is provided with a spiral twine wrapping means which forms no part of the present invention; and that twine wrapping means is manually started and then automatically driven to spirally wrap twine about the bale by continuing to rotate the bale after the front of the baler is elevated and before the gate is opened.

The foregoing detailed description has been given for clearness of understanding only and no unnecessary limitations should be understood therefrom as modifications will be obvious to those skilled in the art.

I claim:
1. Apparatus for rolling large bales of fodder comprising, in combination:
   a frame which has side frame members and supporting wheels;
   a floor supported in said side frame members;
   a plurality of parallel, longitudinal, upwardly open chain guiding channels recessed in said floor;
   endless chain fodder conveyor means having front and rear sprockets and chains with a rearwardly moving working run, said working run of each of said chains being completely recessed in one of said channels, and said chains having only fodder engaging lugs projecting above the floor;
   rotary fodder pickup means at the front of the frame, said pickup means having tines to feed fodder from the ground onto the fodder conveyor means;
   a rear discharge gate pivoted on the side frame members;
   a plurality of parallel endless baling raddle chains connected by raddles extending transversely above the floor, said baling raddle chains being trained over upper and lower forward sprockets journalled on the frame and over upper and lower rearward sprockets journalled on the gate, said chains and raddles having a lower working run from the lower rearward sprockets to the lower forward sprockets, above the floor, so as to define the rear, top and front of the baling chamber;
   chain take-up means including movably mounted take-up sprockets engaging the baling chains and spring means biasing said movably mounted sprockets to minimize the length of the working run of said baling chains;
   means for driving the fodder conveyor means and the fodder pickup means;
   means for driving a forward sprocket to move the working run of the baling raddle chains forwardly above the floor;
   and means for swinging the rear discharge gate between a generally upright baling position and a generally horizontal elevated discharge position.

2. The apparatus of claim 1 in which the means for driving the fodder conveyor means moves the chains rearwardly at a first linear speed, and in which the means for driving a forward sprocket moves the working run of the baling raddle chains forwardly at a second linear speed which is slightly faster than said first linear speed.

3. The apparatus of claim 2 in which the second linear speed is of the order of 6% faster than the first linear speed.

4. The apparatus of claim 2 in which the sides of the baling chamber comprise a pair of raddle guiding members journalled on the side frame members to define the sides of a baling chamber, said members having outer plates substantially the diameter of a finished bale and inwardly projecting narrow, concentric flanges on said plates which support the ends of the raddles and confine the ends of a low density bale core, and said outer plates confining the ends of a higher density outer part of the bale, the diameter of said flanges being substantially less than the diameter of the outer plates, so that said high density outer part is relatively thick.

5. The apparatus of claim 4 in which the diameter of the flanges is of the order of 70% of the diameter of the discs.

6. The apparatus of claim 1 in which the sides of the baling chamber comprise a pair of raddle guiding members journalled on the side frame members to define the sides of a baling chamber, said members having outer plates substantially the diameter of a finished bale and inwardly projecting narrow, concentric flanges on said plates which support the ends of the raddles and confine the ends of a low density bale core, and said outer plates confining the ends of a higher density outer part of the bale, the diameter of said flanges being substantially less than the diameter of the outer plates, so that said high density outer part is relatively thick.

7. The apparatus of claim 6 in which the diameter of the flanges is of the order of 70% of the diameter of the discs.

8. The apparatus of claim 1 which includes lower and upper side frame members, means pivotally supporting the floor on the lower side frame members, and a hydraulic cylinder unit pivotally connected to upper side frame members and to a side of the floor for swinging said floor between a forwardly and downwardly inclined first position with the front of the floor immediately adjacent the ground, and a second position in which the front of the floor is more elevated.

9. The apparatus of claim 8 in which the rotary fodder pickup means is coaxial with the front sprockets of the fodder conveyor means.

10. Apparatus for rolling large bales of fodder comprising, in combination:
a frame which has side frame members and supporting wheels;
a floor supported in said side frame members;
endless chain fodder conveyor means extending longitudinally of the floor, said conveyor means having front and rear sprockets and lugged chains with a rearwardly moving working run supported by the floor;
rotary fodder pickup means at the front of the frame, said pickup means having tines to feed fodder from the ground onto the fodder conveyor means;
a rear discharge gate pivoted on the side frame members;
a pair of raddle guiding members journalled on the side frame members to define the sides of a baling chamber, said members having outer plates substantially the diameter of a finished bale and inwardly projecting narrow, concentric flanges on said plates which support the ends of the raddles and confine the ends of a low density bale core, and said outer plates confining the ends of a higher density outer part of the bale, the diameter of said flanges being substantially less than the diameter of the outer plates, so that said high density outer part is relatively thick;
a plurality of parallel endless baling raddle chains connected by raddles extending transversely above the floor, said baling raddle chains being trained over upper and lower forward sprockets journalled on the frame and over upper and lower rearward sprockets journalled on the gate, and said raddles having their extremities supported on the disc flanges so the chains and raddles have a lower working run from the lower rearward sprocket, over the discs, and down the front part of the frame and define the rear, top and front of the baling chamber;
chain take-up means including movably mounted take-up sprockets engaging the baling chains and spring means biasing said movably mounted sprockets to minimize the length of the working run of said baling chains;
means for driving the fodder conveyor means and the fodder pickup means;
means for driving a forward sprocket to move the working run of the baling raddle chains forwardly above the floor;
and means for swinging the rear discharge gate between a generally upright baling position and a generally horizontal elevated discharge position.

11. The apparatus of claim 10 in which the diameter of the flanges is of the order of 70% of the diameter of the discs.

12. The apparatus of claim 10 in which the means for driving the fodder conveyor means moves the chains rearwardly at a first linear speed, and in which the means for driving a forward sprocket moves the working run of the baling raddle chains forwardly at a second linear speed which is slightly faster than said first linear speed.

13. The apparatus of claim 12 in which the second linear speed is of the order of 6% faster than the first linear speed.

14. The apparatus of claim 10 which includes lower and upper side frame members, means pivotally supporting the floor on the lower side frame members, and a hydraulic cylinder unit pivotally connected to upper side frame members and to a side of the floor for swinging said floor between a forwardly and downwardly inclined first position with the front of the floor immediately adjacent the ground, and a second position in which the front of the floor is more elevated.

15. The apparatus of claim 14 in which the rotary fodder pickup means is coaxial with the front sprockets of the fodder conveyor means.

16. Apparatus for rolling large bales of fodder comprising, in combination:
a frame which has lower and upper side frame members and supporting wheels;
a floor;
means pivotally supporting said floor on said lower side frame members;
a hydraulic cylinder unit pivotally connected to an upper side frame member and to a side of the floor for swinging said floor between a forwardly and downwardly inclined first position with the front of the floor immediately adjacent the ground, and a second position in which the front of the floor is more elevated;
endless chain fodder conveyor means extending longitudinally of the floor, said conveyor means having front and rear sprockets and lugged chains with a rearwardly moving working run supported by the floor;
rotary fodder pickup means at the front of the frame, said pickup means having tines to feed fodder from the ground onto the fodder conveyor means;
a rear discharge gate pivoted on the side frame members;
a plurality of parallel endless baling raddle chains connected by raddles extending transversely above the floor, said baling raddle chains being trained over upper and lower forward sprockets journalled on the frame and over upper and lower rearward sprockets journalled on the gate, said chains and raddles having a lower working run from the lower rearward sprockets to the lower forward sprockets, above the floor so as to define the rear, top and front of the baling chamber;

chain take-up means including movably mounted take-up sprockets engaging the baling chains and spring means biasing said movably mounted sprockets to minimize the length of the working run of said baling chains;

means for driving the fodder pickup means, and for driving the fodder conveyor means to move the conveyor chains rearwardly at a first linear speed;

and means for driving a forward sprocket to move the working run of the baling raddle chains forwardly at a second linear speed which is slightly faster than said first linear speed.

17. The apparatus of claim 16 in which the second linear speed is of the order of 6% faster than the first linear speed.

18. The apparatus of claim 16 in which the rotary fodder pickup means is coaxial with the front sprockets of the fodder conveyor means.

19. Apparatus for rolling large bales of fodder, said apparatus comprising, in combination:

a frame which has lower and upper side frame members and supporting wheels on said lower side frame members;

a floor;

means pivotally supporting said floor on said lower side frame members;

a hydraulic cylinder unit pivotally connected to an upper side frame member and to a side of the floor for swinging said floor between a forwardly and downwardly inclined first position with the front of the floor immediately adjacent the ground, and a second position in which the front of the floor is more elevated;

endless chain fodder conveyor means extending longitudinally of the floor, said conveyor means having front and rear sprockets and lugged chains with a rearwardly moving working run supported by the floor;

rotary fodder pickup means at the front of the frame, said pickup means having tines to feed fodder from the ground onto the fodder conveyor means;

a rear discharge gate pivoted on the side frame members;

a plurality of parallel endless baling raddle chains connected by raddles extending transversely above the floor, said baling raddle chains being trained over upper and lower forward sprockets journalled on the frame and over upper and lower rearward sprockets journalled on the gate, said chains and raddles having a lower working run from the lower rearward sprockets to the lower forward sprockets, above the floor, so as to define the rear, top and front of the baling chamber;

chain take-up means including movably mounted take-up sprockets engaging the baling chains and spring means biasing said movably mounted sprockets to minimize the length of the working run of said baling chains;

means for driving the fodder conveyor means and the fodder pickup means;

means for driving a forward sprocket to move the working run of the baling raddle chains forwardly above the floor;

and means for swinging the rear discharge gate between a generally upright baling position and a generally horizontal elevated discharge position.

20. The apparatus of claim 19 in which the rotary fodder pickup means is coaxial with the front sprockets of the fodder conveyor means.

21. The apparatus of claim 19 in which the means pivotally supporting the floor is coaxial with the supporting wheels and the hydraulic cylinder unit is pivotally connected close to the front of the floor.

* * * * *